United States Patent [19]

Rebane

[11] Patent Number: 5,465,982
[45] Date of Patent: Nov. 14, 1995

[54] METHOD AND APPARATUS FOR DISCLOSING A TARGET PATTERN FOR IDENTIFICATION

[75] Inventor: George J. Rebane, Topanga, Calif.

[73] Assignee: Resrev Partners, Topanga, Calif.

[21] Appl. No.: 172,224

[22] Filed: Dec. 23, 1993

Related U.S. Application Data

[63] Continuation-in-part of Ser. No. 166,365, Dec. 14, 1993, abandoned.

[51] Int. Cl.$^6$ .................................................. A63F 9/24
[52] U.S. Cl. ................ 273/433; 273/153 R; 273/237; 273/273; 434/308; 434/322
[58] Field of Search ....................... 273/433, 434, 273/273, 153 R, 272, 237, 439; 434/176, 333, 322, 323, 307 R, 308

[56] References Cited

U.S. PATENT DOCUMENTS

| | | | |
|---|---|---|---|
| 4,336,935 | 6/1982 | Goldfarb | 273/429 X |
| 4,770,636 | 9/1988 | Buschke | 434/236 |
| 4,932,880 | 6/1990 | Kotick | 434/319 |
| 5,033,969 | 7/1991 | Kamimura | 434/322 |
| 5,056,793 | 10/1991 | Sigle | 273/282 |
| 5,059,126 | 10/1991 | Kimball | 434/308 |
| 5,121,928 | 6/1992 | Salerno-Sonneberg | 273/243 |
| 5,221,094 | 6/1993 | Hanson | 273/431 |
| 5,236,199 | 8/1993 | Thompson, Jr. | 273/439 |
| 5,271,626 | 12/1993 | Llenas et al. | 273/430 |
| 5,277,587 | 1/1994 | Aiken et al. | 434/333 |
| 5,288,075 | 2/1994 | Kelley | 273/243 |
| 5,296,845 | 3/1994 | Haller | 273/434 |

*Primary Examiner*—Jessica J. Harrison
*Attorney, Agent, or Firm*—Finnegan, Henderson, Farabow, Garrett & Dunner

[57] ABSTRACT

Methods of disclosing a target pattern for identification. The methods are based on the principle of sequentially and non-lexicographically revealing, constructing and/or resolving a target pattern to players to permit the players to identify the target pattern. One such method includes the steps of masking the target pattern to make it imperceptible to the player, repetitively unmasking portions of the target pattern according predetermined unmasking steps, and continuing to unmask the target pattern until a completion criterion is met. Target patterns may consist of still images, audio segments, or motion video sequences depicting items and environments known to the players in their unmasked formats.

15 Claims, 9 Drawing Sheets

METHOD AND APPARATUS FOR DISCLOSING A TARGET PATTERN FOR IDENTIFICATION

This is a continuation-in-part of application Ser. No. 08/166,365 filed on Dec. 14, 1993, now abandoned.

BACKGROUND OF THE INVENTION

The present invention relates to methods of disclosing a target pattern for identification. The methods according to the present invention are based on the principle of sequentially and non-lexicographically revealing, constructing and/ or resolving a target pattern to players to permit the players to identify the target pattern in a game format.

Revelation of a target pattern involves sequentially "unmasking" a target pattern to make the pattern progressively more recognizable to a player.

Construction of a target pattern relates to different techniques. Incremental construction involves adding to a blank space portions of a target pattern. Construction can also involve presentation of a first pattern to a player and then sequentially transforming or "morphing" into the target pattern.

Resolution involves sequentially making the target pattern "clearer" to a player, for example, by bringing the target pattern progressively into focus.

Combination involves making the target pattern recognizable to a player by a combination of revelation, construction and resolution.

"Non-lexicographic" revelation means revelation that is independent of language or letter. For example, when a masked target pattern is non-lexicographically revealed to a player, each step of the revelation does not necessarily produce readable characters or words to the player. This is true even if the target pattern contains text, in which case portions of letters may be revealed.

In non-lexicographic revelation, random portions of the target pattern that do not correspond to a semantic entity, such as a letter, word, or sentence, are presented to the player. This is different from games in which semantic entities, such as letters, are presented to the players.

The present invention has broad application in the fields of entertainment and education. Target pattern recognition according to the present invention is not limited in the manner in which the player is presented with the target pattern or in which the target pattern is made recognizable to the player.

In contrast, prior art games are limited in the manner in which the target patterns are made recognizable to the player and are limited in the manners in which the player can play the game. For instance, the game "Concentration" involves the progressive revelation of an English language sentence or phrase that is written in picto-lexicographic form, also known as a rebus. However, the sentence or phrase revealed in Concentration is an ad hoc kind of writing. The sentence or phrase as revealed must be read by the player. Thus, the identification in Concentration is language dependent and the player must be literate to play.

Additionally, in the game Concentration, there is only one exact syntax string that identifies the revealed target pattern. That is, if the correct identification is "there's no place like home," then the identification "there's no place like a house" will not be correct. Only the identical syntax string "there's no place like home" will be a correct answer. Because proper identification can only be made according to that one syntax string, correct identification can be difficult even for literate players.

Other target pattern identification games by revelation are known in the prior art as well. Such games include the successive revelation of a target pattern of a rock music star on a children's television station and the successive revelation of a sports figure on a sports television station. However, such games are played in the same location as the players and are not, therefore, user interactive. Thus, play of such games is limited to those in the same location as the game play. Additionally, these games, as well as Concentration, use only the target pattern disclosure method of revelation, and not construction, resolution or a combination of revelation, construction and resolution. Additionally, such games do not contemplate the revelation of moving video, audio or hybrid target patterns or other mixed media or multimedia patterns. The revelation of such target patterns greatly expands the challenge and the usefulness of the target pattern disclosure methods.

U.S. Pat. No. 4,630,831 issued to Stadden discloses a tile game. However, in the game disclosed by Stadden, the tiles form the pattern. There is no identification of an underlying target pattern and the tiles are not sequentially removed for identification of a pattern.

It is therefore an object of the present invention to provide methods of disclosure for target pattern identification including the sequential resolution, revelation and/or construction of target patterns.

Another object of the present invention is to provide methods of target pattern disclosure suitable for a broad range of applications and available to a wide range of people.

A further object of the present invention is to provide methods of disclosure for target pattern identification which are language-independent.

A still further object of the present invention is to provide methods of disclosure for target pattern identification that are user interactive and in which networked players can play at remote locations.

Another object of the present invention is the provision of disclosure methods which may be implemented on various interactive display media according to preset rules.

Another object of the present invention is to provide methods of disclosure for target pattern identification for use in a broad range of locations, including, for example, home, classrooms, taverns, casinos, hotels, and arcades.

Additional objects and advantages of the invention will be set forth in part in the description which follows, and in part will be obvious from the description, or may be learned by practice of the invention. The objects and advantages of the invention will be realized and attained by means of the instrumentalities and combinations particularly pointed out in the appended claims.

SUMMARY OF THE INVENTION

To achieve the objects and in accordance with the purpose of the invention, as embodied and broadly described herein, the invention comprises a method of presenting a target pattern to be perceived by a player for identification of the target pattern comprising the steps of masking the target pattern to make it imperceptible to the player; repetitively unmasking the target pattern according to predetermined resolution steps; and continuing to unmasking the target pattern until a completion criterion is met.

Additionally, the present invention comprises a method of progressively constructing a target pattern to be perceived by a player for identification of the target pattern comprising the steps of presenting a target pattern area to the player; repetitively constructing the target pattern in the target pattern area according to sequential non-lexicographic augmentation steps; and continuing to construct the target pattern until a completion for target pattern identification criterion is met.

The present invention further comprises a method of presenting a target pattern to be perceived by a player for identification of the target pattern comprising the steps of masking the target pattern to make it imperceptible to the player; repetitively making the target pattern identifiable according to a combination of non-lexicographic revelation, resolution and construction steps; and continuing to make the target pattern identifiable until a completion criterion is met.

The present invention still further encompasses a method of presenting a moving video target pattern to be perceived by a player for identification of the moving video target pattern comprising the steps of masking the moving video target pattern to make it imperceptible to the player; repetitively unmasking predetermined portions of the moving video target pattern according to non-lexicographic revelation steps; continuing to unmask the moving video target pattern until a completion criterion is met.

Additionally, the present invention comprises a method of presenting an audio target pattern to be perceived by a listener for identification of the audio target pattern comprising the steps of masking the audio target pattern to make it imperceptible to the listener; repetitively unmasking predetermined portions of the audio target pattern according to preselected steps; and continuing to unmask the audio target pattern until a completion criterion is met.

The present invention additionally comprises a method of presenting a hybrid target pattern including a combination selected from the group of audio signals, moving video signals and still video signals to be perceived by a player for identification of the hybrid target pattern comprising the steps of masking the hybrid target pattern to make it imperceptible to the player; repetitively unmasking predetermined portions of the hybrid target pattern according to preselected steps; and continuing to unmask the hybrid target pattern until a completion criterion is met.

Still further, the present invention comprises a method of presenting a target pattern to be perceived by a player for identification of the target pattern, the method comprising the steps of receiving the target pattern using a personal computer, a dedicated game computer, an interactive television, and a virtual reality interface; masking the target pattern to make it imperceptible to the player; repetitively unmasking predetermined portions of the target pattern according to preselected steps; and continuing to unmask the target pattern until a completion criterion is met.

The present invention also comprises apparatus for disclosing a masked target pattern to a player for identification of the target pattern by the player, comprising a data processing system for masking the target pattern, for performing processing on the masked target pattern to repetitively unmask the target pattern in response to input from the player and for comparing a target pattern identification input by the player with a known correct target pattern identification; an input device, coupled to the data processing system, for receiving the player input; and an output device, coupled to the data processing system, for outputting the masked target pattern to the player as the target pattern is repetitively unmasked and for outputting and for outputting an indication of whether the target pattern identification input by the player is equivalent to the known correct target pattern identification.

According to the present invention, the target pattern can be delivered to a player by various interactive multimedia computer technologies, in a board game or by print media. Various rule sets can be applied, resulting in the award of points to the player who first correctly identifies the target pattern. The rule sets may be applied via various algorithms. For example, misidentification of the target pattern could result in continuance of play by the next player or could result in the termination of play with a penalty to the unsuccessful player.

The target patterns to be identified according to the methods of the present invention can include visual or aural patterns. Typical visual target patterns could include photographs, paintings, cartoons of various subject categories (e.g. of movie stars, cars, scenes) or eclectic mixes. The visual target patterns could also include moving video patterns.

Aural target patterns could include audio sequences consisting of famous statements, musical phrases, and popular sound signatures. Examples of aural target patterns are: "Ich bin ein Berliner," John F. Kennedy; "We have nothing to fear except fear itself," Franklin D. Roosevelt; "Frankly, my dear, I don't give a damn," Rhett Butler; the opening bars of Beethoven's Fifth Symphony; a steam locomotive; and a dripping faucet.

The target pattern to be identified can be presented to a player via cable or broadcast interactive TV in which the games could be played within a single home or set up for regional play such as in a neighborhood or nationwide. The game could also be played in taverns or cafes where it would join the growing number of electronic "saloon games" that provide additional interest to the establishments that offer them.

The games according to the present invention can also be used in classrooms as an educational tool when target pattern sets covering the classroom curriculum are used. Furthermore, the target pattern identification could be implemented as a TV game show or could be played in the home using an interactive CD player, other multimedia systems, a personal computer or a video game.

Still further, the target pattern identification games according to the present invention could be implemented in casinos where different versions could be made for use in single play, similar to a slot machine, or in group play, such as poker versions. Alternatively, the target pattern identification could be implemented as an arcade game. This venue could attract a new kind of customer to the coin-operated arcades. The versions here could be single or competitive play using machine paced disclosure to limit the time of play.

Additionally, several types of psychological and medical test categories (intelligence, aptitude, experience verification, sensory impairment diagnosis) could be established using the target pattern identification paradigm.

Finally, the target pattern identification could be employed in newspapers and periodicals. The various disclosure methods for target pattern identification can be published as games that resolve, reveal or combine target patterns in succeeding issues of periodical print media using subject matter that is germane to the readership of the periodical.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate the presently preferred embodiments of the present invention and together with the description, serve to explain the principles of the invention.

In the drawings.

DESCRIPTION OF THE PREFERRED EMBODIMENTS

Reference will now be made in detail to the presently preferred embodiments of the invention, examples of which are illustrated in the accompanying drawings. Wherever possible, the same reference numbers will be used throughout the drawings to refer to the same or like parts.

According to the present invention, target patterns are masked and unmasked during game play. To mask a target pattern is to make the target pattern less readily identifiable. To unmask a target pattern is to make the target pattern more readily identifiable. Unmasking can, for example, be performed by revealing, resolving, or constructing the target pattern. Unmasking can also be performed by a combination of revealing, resolving, or constructing the target pattern.

Figure 1:
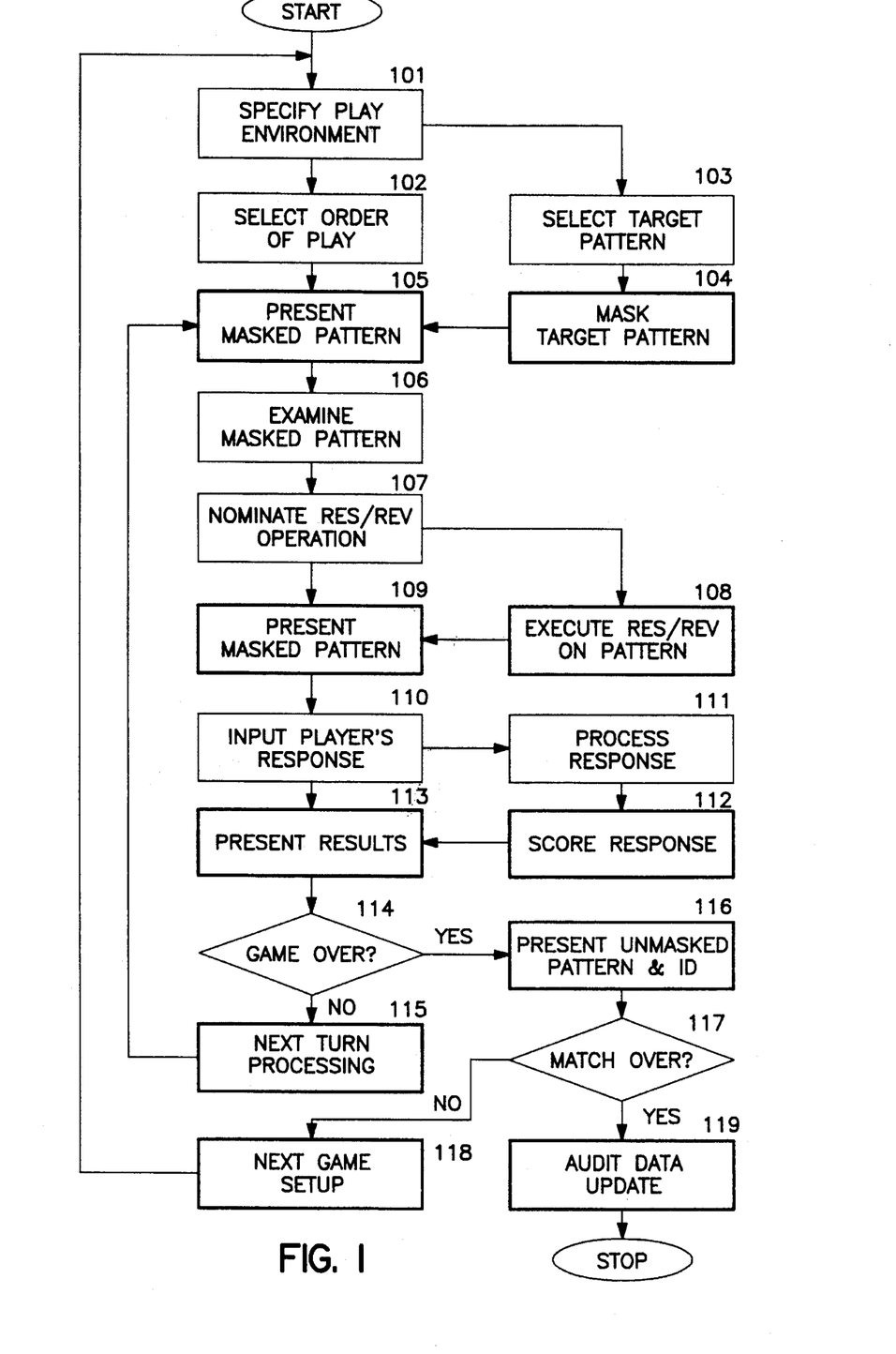
FIG. 1 is a flow chart showing a generic logic flow common to the methods of implementing and executing play of the genre of games according to the present invention.

FIG. 1 is a flowchart showing the generic logic flow common to the methods of implementing and executing play of the genre of games according to the present invention. As explained above, the present invention is directed to the ordered non-lexicographic resolution, construction and/or revelation of masked target patterns which may be alphanumeric strings, still images, video sequences and audio segments.

The flowchart of FIG. 1 is implemented with the aid of a data processing system, an input device, a display, a speaker or other similar output device and communication means, if necessary.

The flowchart of FIG. 1 can apply to all types of pattern disclosure modes, target pattern media, player groupings, interactivity modes, delivery modes and play venues. In a preferred embodiment of the present invention, the delivery mode uses a stand alone or networked interactive multimedia computer. It may also use an electronic device, such as a virtual reality system.

According to the flowchart shown in FIG. 1, the play environment is first specified (step 101). Specification of the play environment includes specifying the player groups, selection of the game type, choice of the target pattern source category, and selection of the play level. Other options can also be set in this step.

The player groups can be selected in a number of ways. For instance, player groups can be selected by specifying a group of teams by the first names of the players. Alternatively, player groups can be selected by having one person represent each group. Of course, most games can be played by a single player.

Figure 2:
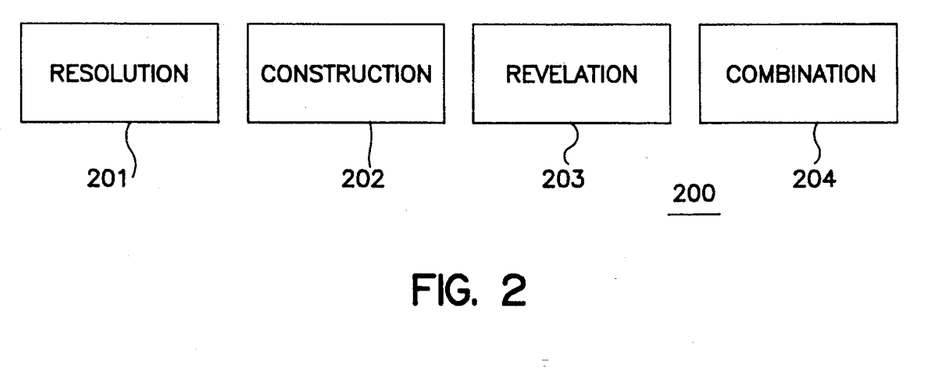
FIG. 2 is a pictorial representation of selections available for choosing the type of game to be played.

To select the type of game using an interactive video terminal, a player would actuate a button corresponding to the type of game that is to be played. FIG. 2 is a pictorial representation of a portion of a key pad or screen 200 containing selections available for choosing the type of game to be played. As shown in FIG. 2, one of the buttons 201–204 allow one to select resolution, construction or revelation or a combination of these. Physically the buttons could be actuated by depressing a key corresponding to the desired game, using a mouse and "clicking" on the displayed button, touching a button on a touchscreen, or by speaking the name of the desired game type into a computer having voice recognition. The combination selection 204 will allow players to play a game in which the target pattern is unmasked by a combination of two or more of the resolution, construction and revelation techniques.

Figure 3:
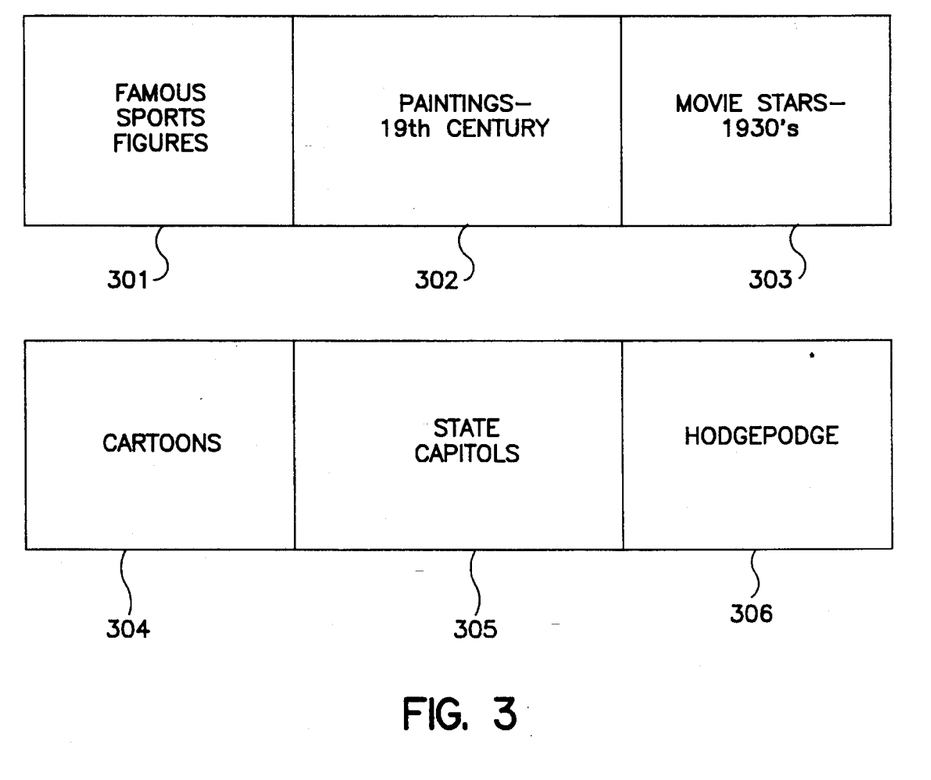
FIG. 3 is a pictorial representation of exemplary categories from which a target pattern may be selected.

After the type of game is selected, the category of the target pattern is selected. The categories can be provided in many different ways, such as by age group, by subject matter, or alphabetically. FIG. 3 is a pictorial representation of a portion of a keyboard or screen having buttons 301–306 corresponding to categories from which a target pattern may be selected. The categories can be physically selected in the same manner as described above with respect to FIG. 2.

In step 101 of FIG. 1, the players can select the level of play such as "beginner", "intermediate" and "advanced." In an alternate embodiment of the present invention, the game can simply default to a certain level of play thereby obviating the need for an additional selection by the players of the level of play.

Additionally, in step 101, a player can select the play venue which includes selecting where the game is to be played. Selection of the play venue can be performed by a player interconnecting to a central processing area to implement play via an interactive television. In certain embodiments of the present invention, the selection of the play venue is unnecessary because there is only one possible play venue, for example, when the game is played via a hand-held game computer in the home.

In step 102 of the flowchart shown in FIG. 1, a player selects the order of play. The order of play can be one or multiple turns per play or the forfeiture of a player's turn under certain conditions. The order of play can also be automatically set and therefore not selectable by the players.

In step 102 the rule set that will apply to the game can also be selected by a player. Rule sets may be selected from a number of available choices. Specific examples of the rule sets that can be selected are set forth below. Alternatively, the game can be established to default to a specified rule set.

The data processing system preferably selects the target pattern (step 103) from the category selected by the player in step 101 by a random draw from the available target patterns stored in a target pattern archive. Another player or a third party, such as a teacher, could also make the selection.

After the specific target pattern is selected, the data processing system masks the target pattern (step 104). The masking depends on the underlying media and the rule set. For example, in the resolution version of the game, a still image can be masked by regularly or irregularly partitioning and quantizing the target pattern with the mean pixel value for each partition. For the revelation version of the game, the target pattern can be completely or partially masked by regular or irregular tiles of uniform pixel values.

Figure 4:
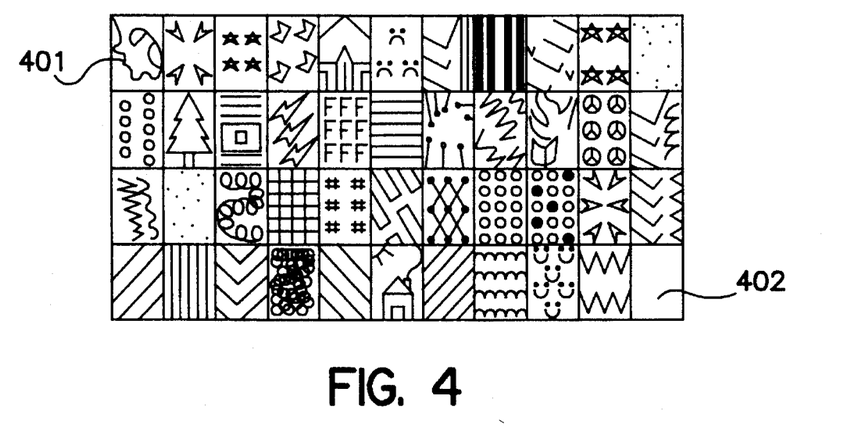
FIG. 4 is a representation of regularly-shaped tiles that can be used to mask a target pattern.

Examples of regularly-shaped tiles that can be used in the revelation game are shown in FIG. 4. As shown in FIG. 4, each of the tiles 401 can include a design serving to further mask the target image. Alternatively, the regularly shaped tiles 402 shown in FIG. 4 can be blank.

Figure 5:
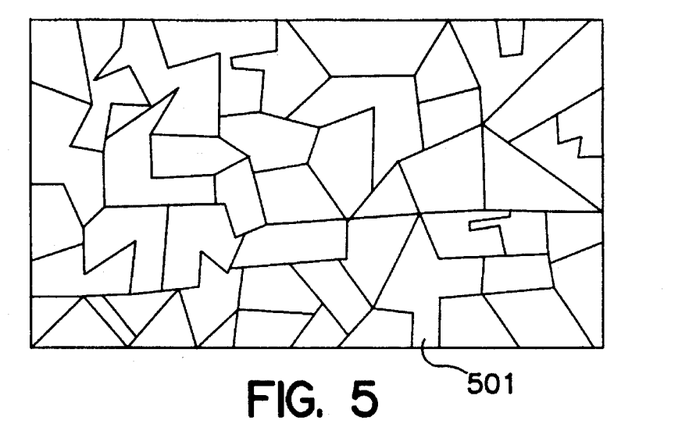
FIG. 5 is a representation of irregularly-shaped tiles that can be used to mask a target pattern.

FIG. 5 is a representation of irregularly-shaped tiles 501 that can be used to mask a target pattern. The irregularly shaped tiles of FIG. 5 can be blank or can be patterned, as shown in FIG. 4.

Figure 6:
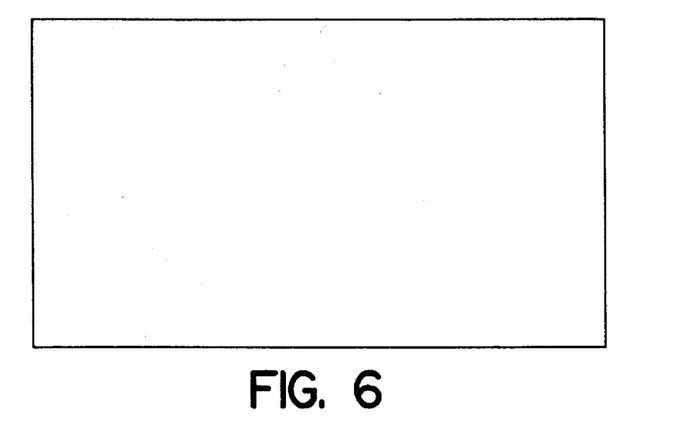
FIG. 6 is a representation of a blank screen that may be presented to the players in the construction version of the game.

In the construction version of the game according to the present invention, a blank screen, such as in FIG. 6 is preferably presented to the players. The target pattern would then be constructed or built up in regularly or irregularly-shaped pattern pieces on the blank screen.

Alternatively, a first pattern can be presented to the players. During play, the pattern is sequentially "morphed" or transformed into the target pattern.

Audio target patterns can also be masked in step 104 of FIG. 1. In the resolution version of the game where an audio target pattern is to be identified, an audio sequence can be distorted through any of a number of signal distorting algorithms, such as a high pass filter or suppression of portions of the target pattern. The data processing system can suppress the entire audio target pattern or only portions of the target pattern. Alternatively, the data processing system can construct a confusing audio mask to cover all or portions of the audio target pattern.

After the data processing system masks the target pattern in step 104, the data processing system presents the masked target pattern to the players (step 105) in appropriate machine/player pacing. For instance, if the game is implemented using a personal computer, the computer can pace the unmasking of the target pattern at a certain rate. Alternatively, the data processing system could direct which portion is to be unmasked next with the players directing the pace of the game. The game could also be completely player directed and paced as well.

Repetitive access to the masked target pattern may itself be governed by the rules of the game, described in greater detail below. For instance, a masked target pattern can be presented only once to the players or can be presented several times.

The players examine the masked target pattern after it is presented to the players (step 106). The current player, called the "turn player", may display the masked target pattern or the masked target pattern can be reoriented on the display. In step 106, the turn player examines the masked target pattern to decide which portion of the target pattern to unmask.

In an audio embodiment of the present invention, the turn player can listen to the masked target pattern and any portions of the target pattern that have been unmasked. In a construction embodiment of the present invention, the examination of step 106 preferably includes examination of the partially or totally blanked display or the image that is to be morphed. In a resolution embodiment of the presentation, the examination of step 106 can include the examination of a target pattern that is resolved at certain portions and or with certain detail. This "quantized" resolution is described below. Finally, in a revelation embodiment of the present invention, the examination of step 106 comprises an examination of the tiles that mask the target pattern and any unmasked portions of the target pattern.

After the masked target pattern is examined, the turn player selects a part of the masked target pattern to be further revealed, resolved or constructed (step 107). In an embodiment of the present invention in which the game is performed by a combination of resolution, revelation and/or construction, the selected part of the target pattern is further revealed, resolved or constructed, as appropriate.

In the nomination step 107, an appropriate set of steps will be carried out to reveal, resolve or construct the selected portion of the masked target pattern. These steps can include simply removing a selected masking tile from a still or moving image in a revelation mode. Alternatively, a Laplacian edge-enhancement filter process can be performed on the masked target pattern (or portion thereof) in a resolution mode.

After the target pattern portion is nominated in step 107, the data processing system implements the resolution, revelation and/or construction on the nominated portion of the target pattern (step 108) to modify the masked target pattern.

After the modification is performed on the target pattern, the data processing system presents the target pattern to the turn player (step 109) in a manner similar to step 106 and the turn player is permitted to examine the modified masked target pattern.

After examination, the turn player attempts to identify the target pattern and provides a response (step 110). For example, the turn player can attempt to identify the target pattern by entering an ID label through an interface device such as a keyboard, a voice processing device or virtual reality device. Virtual reality devices include body position sensors such as a data glove.

The turn player can also "pass" his turn if he cannot or does not wish to identify the target pattern. Passing allows other players to guess the target pattern. Different rule versions of the game, discussed below, can allow other players to offer identifications of the target pattern at the current level of revelation, resolution or construction for additional scoring benefit.

The data processing system processes the player response (step 111). If the turn player response in step 110 is a pass, the processing preferably comprises a simple logging of a player performance data table. Such a data table includes information about the players such as an identification and score.

If the turn player or another player has entered a target pattern identification, then in step 111, the data processing system evaluates the correctness of the identification according to one of several algorithms. A simple version of an evaluation algorithm may require an exact match to the stored correct answer in order for an identification to be made. More sophisticated versions of the game will implement exact and semantic proximity measures. For example, a spelling checker can be included so that if a written identification is made, a correct answer will still be indicated even if the player spells the answer incorrectly.

Alternatively, text understanding software can be employed. Such software can implement a syntactic algorithm to allow identifications that are close in words to the correct answer. Such an algorithm could indicate as correct an identification of "Golden Gate" for a target pattern of the Golden Gate Bridge.

Additionally, in an embodiment in which the player speaks the answer, step 111 can include voice recognition software in which one of several spoken words or phrases can correctly identify the target pattern.

After the player response of step 111 is processed, the data processing system scores the response (step 112). The processing performed in step 111 is accounted for in an algorithm that considers the 'state of the game' including what all players have done earlier in the game, including their scores. For example, if the target pattern is not identified in that turn, the total point value of the target pattern can be decremented so that the player who subsequently identifies the target pattern correctly earns fewer points because more of the pattern is available to the player to make the identification.

The scoring results tallied in step 112 can then be presented to the players through the play system display (step 113). The presentation of step 113 can vary from partially selective, allowing only the turn player to see his score, to totally open, allowing all players to obtain evaluative data on the previous turn player's response in addition to the score standings.

The presentation may be made through any of the available delivery media, or through combinations of delivery media. For example, the player's score can be displayed on a monitor at the same time as the score is spoken or music is played. Additionally, the presentation of step 113 can trigger collateral events, such as automatic crediting/debiting of a cash account if the game is used, for example, in a casino environment.

Next, a decision is made whether the game is over, such as evaluating whether the scoring in step 113 resulted in a "game over" condition (step 114). If the game is not over, play proceeds to next turn processing (step 115). This processing prepares the environment, the current state of the target pattern, game state data tables and presentation media files containing available target patterns for the next turn. Then, the data processing system returns to the presentation of the masked target pattern in step 105. The masked target pattern presented in step 105 includes the changes made in the previous player turn.

If the game is over the unmasked target pattern and its identification thereof are preferably presented to the players (step 116). The data processing system may also make available additional data including the players' standings with respect to scores.

Alternatively, in step 116, access to the unmasked target pattern and the identification of the target pattern can be selectively denied to certain players. This may be done if the target pattern is to be used again in a succeeding game in a multi-game match environment.

After the presentation and identification, a decision is made as to whether the match should be ended (step 117). If not, the data processing system sets up for a new game. The data processing system returns to step 101 for the players to specify the play environment.

If the match is over the data processing system terminates the game session (step 119). In preferred embodiments of the present invention the data processing system displays an end screen for input of the players' options, such as entry of a player's initials into a list of high scoring players if his score is high enough. Additionally, the data processing system performs internal processing to record and process current game/match results for optional storage in a database. Such a database may include player performance records, player identifications, player preferences, etc. The database can be located at a site remote to the play delivery system.

An example of a resolution game according to the present invention will be described next. The resolution game involves the sequential process of resolving a target pattern into finer elements until the target pattern is identified. Resolution of the target pattern is preferably performed by one of a number of defining or resolving algorithms taken from the technical field of signal/pattern analysis. For example, a straightforward example of target pattern resolution is averaging the target pattern components in a given region of the target pattern. Additionally, certain versions of the game may allow the player to select a resolution algorithm from a catalog of available algorithms before the start of the game.

The resolution embodiment of the present invention includes either visual or aural resolution. The visual resolution embodiment of the game according to the present invention involves the sequential improvement of the resolution, i.e., deconstruction, of the target pattern in a selected region of the pattern. The regions may be of regular or irregular shapes.

The visual resolution game may be made appropriate for different age groups by controlling the granularity of the regions and/or the subject matter of the target patterns.

In the aural resolution game according to the present invention, audio target pattern segments may be nominated for further resolution. The resolution of the selected audio segment may be the exact analog of the visual resolution via various signal processing algorithms in the time or frequency domains. Additionally, the analog of total target pattern resolution may be pursued by processing the target pattern through a player selectable series of filters which in the duration of play are "widened" until the target pattern is identified.

Figure 7:
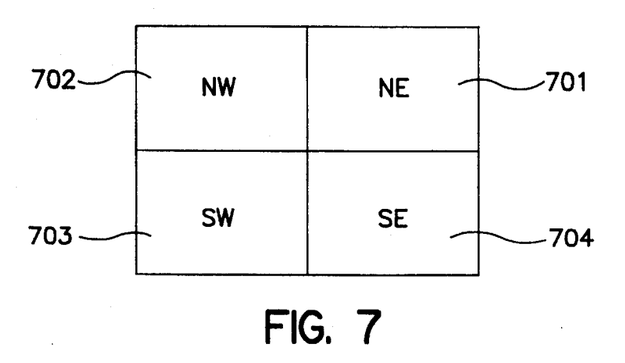
FIG. 7 is a representation of a target picture area pattern divided into four parts for the resolution game.

One version of the visual resolution game of the present invention preferably begins with the target pattern being divided regularly into a number of parts. FIG. 7 is a representation of a target pattern divided into four parts for the resolution game. Division into four parts is merely exemplary, and other divisions could also be implemented in accordance with the present invention.

As shown in FIG. 7, the target pattern is resolved into four recursive quartile picture areas (pixars) 701–704. Each of the pixars 701–704 is preferably of uniform hue or shading and comprises a uniform target pattern pixar that is the computed average of the fully resolved target pattern elements. The pixars 701–704 represent an initial resolution, called stage one (S1) of $4^1=4$ rectangular pixars. The four pixars 701–704 are further labeled according to their map analogs of respectively, NE, NW, SW, and SE. The four pixars 701–704 may be represented for computer processing by a two bit nibble such that NE=(00); NW= (01); SW=(10); and SE=(11).

The fully formed target pattern can preferably be an (X,Y,Z) pixel map of, for example, (300×250×16) pixels. Such a configuration results in a target pattern of 75,000 pixels, each 16 pixels deep, requiring approximately 150 KB of uncompressed storage. Additionally, the pixel depth can be RGB555 allowing the display of images with a color palette containing 32,768 colors.

The resolved target pattern can be stored in a storage device at the site that the game is played or can be stored at a location remote to the play of the game, for example, in a central storage location. Additionally, the target pattern in a coarser form (less resolved) is also preferably stored. The storage of less resolved versions of the target pattern is desirable because in most cases the target pattern will be identified before the pattern is completely resolved. Therefore, storage of a completely resolved target pattern which requires much greater amounts of storage space is not necessary.

As the game proceeds, a player may select one of the pixars 701–704. The selection of one of the pixars 701–704 causes that pixar to be more fully resolved by resolution into four smaller pixars.

Figure 8:
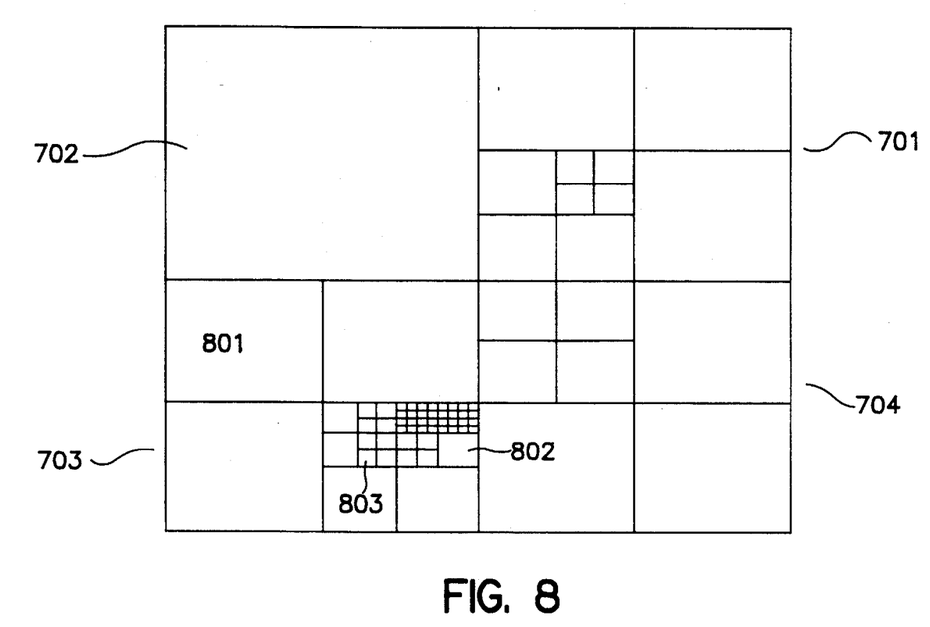
FIG. 8 is a representation of the target pattern shown in FIG. 7 more fully resolved during the course of play.

FIG. 8 is a more fully resolved representation of the target pattern shown in FIG. 7. The selected pixar is further divided into four smaller parts each of which represents the computed average of four areas of the underlying target pattern. For example, pixar 801 in FIG. 8 is the average of the NW pixels of the target pattern underlying pixar 703. Pixars 802 and 803 are successively more fully resolved pixars of the target pattern.

The uniform color, or shading for gray scale images, of a pixar is therefore computed as the average color of the constituent fully resolved pixels in the applicable color space. This average value can be derived with less processing from any higher stage quartiled resolution of that pixar. Thus, it is advantageous to use a coarser version of target pattern as the starting point for computing the color of the more fully resolved pixars, during the progress of the game, instead of using the fully resolved target pattern.

Figure 9:
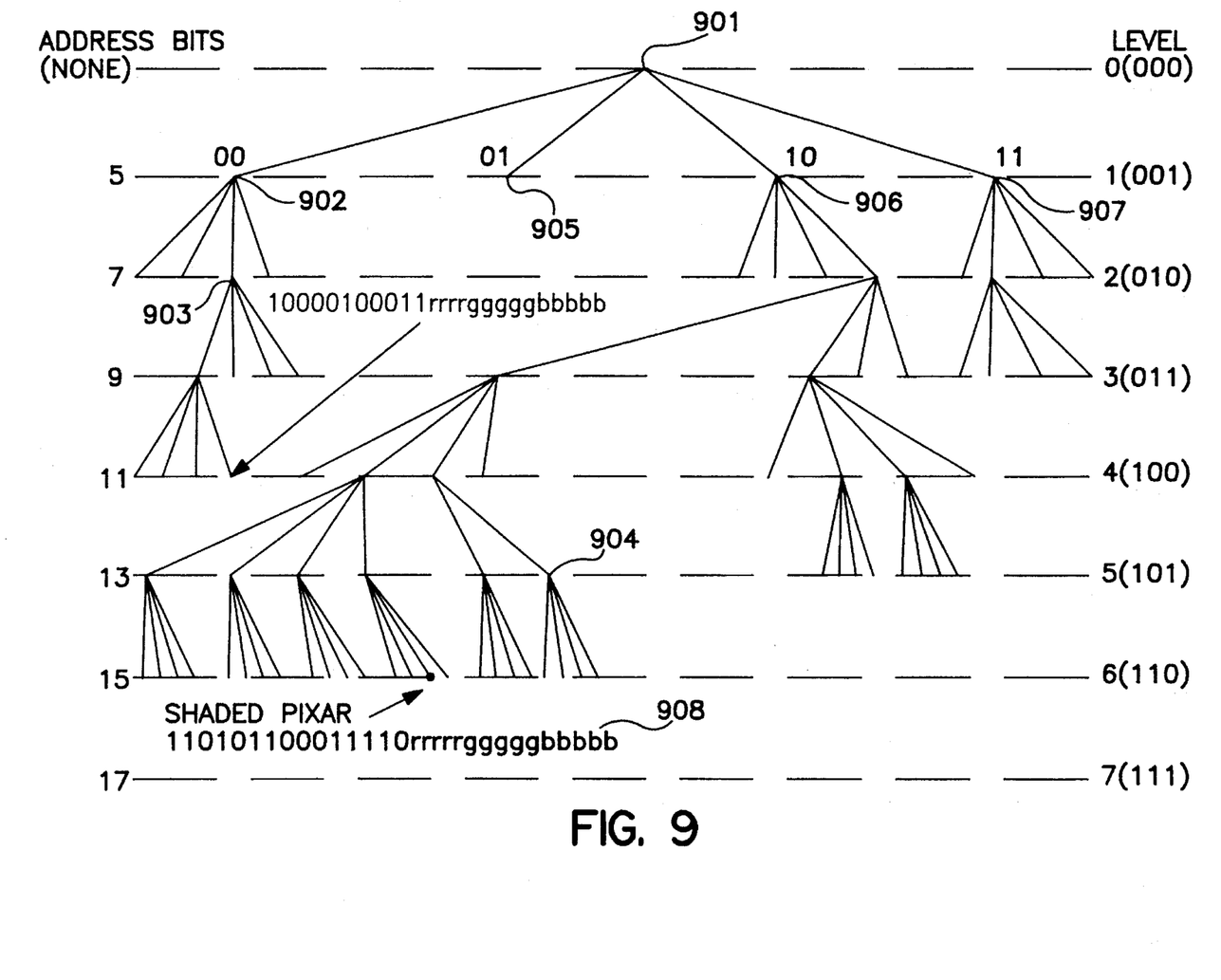
FIG. 9 is a representation of a tree structure of a block quantization scheme for target pattern representation.

The resolution game would continue in this fashion with the target pattern being more and more fully resolved. After a number of turns, the more fully resolved target pattern may then appear as shown in FIG. 8. It is preferable to represent the partially resolved target pattern of FIG. 8 in a compact manner that uniquely encodes the state of the image and compactly addresses each pixar. This can be accomplished by using a block quantization addressing scheme. FIG. 9 is a representation of a tree structure of a block quantization scheme for target pattern resolution.

As shown in FIG. 9, the block quantization may be represented by a tree in which each node 901–907 has four descendent branches. The descendent branches shown in FIG. 9 represent the levels of resolution. For example, level 1 represents pixars 701–704 shown in FIG. 7. As shown in FIG. 9, node 902 corresponds to the pixar 701 which can be represented in binary form as (00). Nodes 905, 906, and 907 respectively correspond to pixars 702–704.

In the representation shown in FIG. 9, level 0 defines a uniform image field of $4^0=1$ color, or grey scale. A target pattern uniformly resolved to level 3 defines an image with a maximum of $4^3=64$ pixars of uniform colors. The tree structure of FIG. 9 represents the quantization of FIG. 8 and shows the unequal levels of resolution that will occur as the game proceeds.

The address and state of each pixar can be efficiently expressed as a concatenation sequence of the above-described nibbles along with a level number header. This permits a 32 bit word to specify the location, size and color of any pixar in an image consisting of $4^7=16384$ pixars, each being 15 bits or 32,768 colors deep.

In the form of compact representation shown in FIG. 9, the first three bits represent the level of resolution. For example, bit pattern 908 is a resolution at level 6 and therefore the first three bits are binary 110. The following fourteen bits, which are in seven groups of two bit nibbles, represent the path down the quantization tree to the exact location and size of the pixar. In bit pattern 908, for example, bits 14 and 15 are respectively 1 and 0. This corresponds to the denoted shaded pixar being located in the SW or 10 designation, as shown in level 1.

The last 15 bits of the bit pattern 908 represent the coordinates of the RGB components defining the pixar's color. This encoding protocol is sufficient for representing and constructing target patterns on all NTSC, PAL and SECAM television formats. The complete image at any point can accordingly be represented by a list of encoded pixars. This list can be formed by a left-to-right, depth-first inspection of the tree shown in FIG. 9.

Use of such a method of storing the encoded data is advantageous because it is necessary only to store as much information as corresponds to the currently resolved target pattern. Additionally, the length of each data item includes the minimal amount of data needed to locate and construct the pixar. The list of encoded entries will be augmented with four additional entries replacing the single entry (for a net gain of three entries) every time any one pixar is resolved during the course of play. The resolution is an unmasking of the target pattern, because the combined data of four data items is separated out, or deconstructed, into the individual data of those elements.

An additional benefit of the block quantization shown and described with respect to FIGS. 7–9 is that each sequential resolution minimally affects the representation of the currently formed image (target pattern) and incrementally allows just that portion of the target pattern that is to be further resolved to be updated in a display buffer before the screen is redrawn.

The encoding shown and described with respect to FIGS. 7–9 also preferably results in a saving of storage space. The intermediate target pattern shown in FIG. 8 and represented in FIG. 9 requires approximately 229 bytes of storage for complete definition. This results in a saving of approximately 99.8% of the storage space required to completely represent the fully resolved target pattern. Additionally, if the resolved target pattern is stored at a level of less than complete resolution, as described above, at, for instance level 6, there should still be a savings in storage of approximately 99.6%.

In another embodiment of the visual resolution game according to the present invention, resolution of the target pattern involves operating on the entire displayed target pattern during each player's turn. In such an embodiment, the turn player may select or "widen" an image filtering algorithm to process the entire target pattern for display.

A simple example of such resolution may be straightforward focusing wherein the initially displayed target pattern is totally unfocussed and each player "turns up the focus" in preset increments until the target pattern is identified. More exotic approaches can be taken with applications of certain types of spatial frequency filters operating in either the domains of hue, intensity, and saturation or other suitable coordinate systems. These sophisticated algorithms may be used by the non-technical player through a variety of man-machine interface techniques regularly practiced in the interactive computer field.

As described above with respect to FIG. 1, in step 112, a scoring is performed while the game progresses. Scoring performed in the resolution embodiment of the present invention can be based on the extent to which the target pattern has been resolved during the progress of the game. Similarly, in the revelation, construction and combination versions of the game, scoring can be effected based on how much of the target pattern has been made available for inspection to the players.

In the resolution embodiment of the invention, the scoring value attributed to a correct identification of a target pattern from a collection of fewer pixars would be greater than the scoring awarded to a more fully resolved target pattern. Preferably, at a predefined level of resolution the awarded score is zero because all players should immediately be able to identify the target pattern at that level of resolution. Thus, scores can be assigned based on the difference in the number of pixars between the resolution level at which zero points are awarded and different and less resolved levels which necessarily include fewer pixars.

The flow diagram of FIG. 1 describes the sequence of play according to the present invention in which a portion of the target pattern to be further revealed, resolved and/or constructed is nominated in step 107 and then presented to the player(s) in step 108. An alternate embodiment of the play sequence is discussed below with respect to the resolution game, although such sequence could be implemented in any of the games of the present invention.

Figure 10:
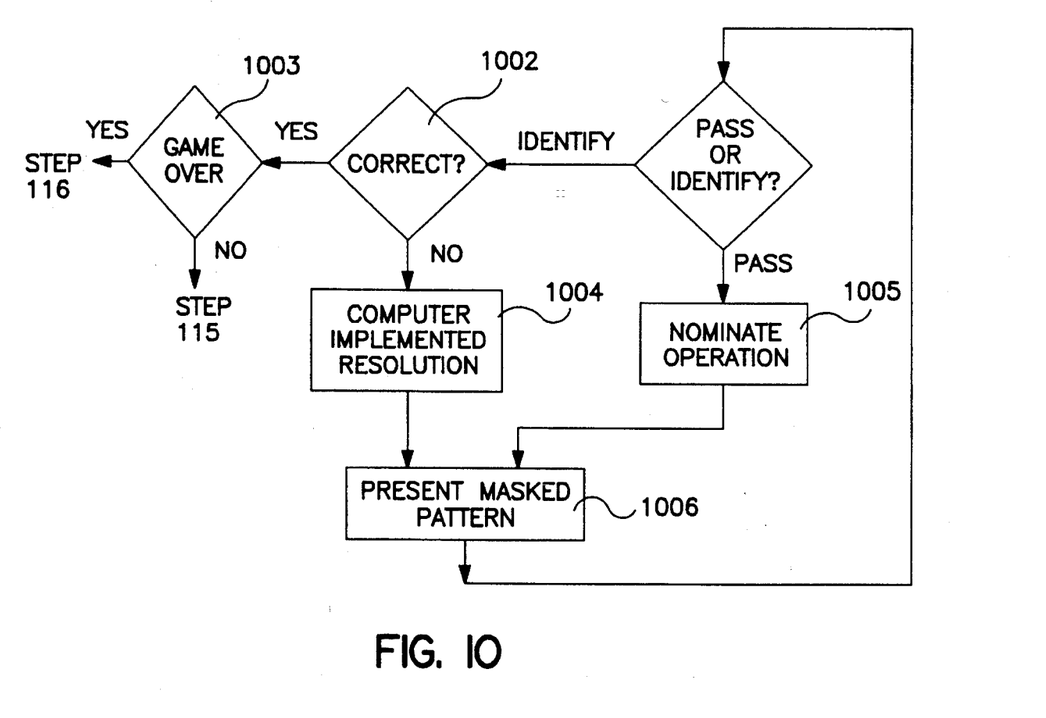
FIG. 10 is an abbreviated flowchart of an alternative play sequence from that shown in FIG. 1 according to the present invention.

FIG. 10 is an abbreviated flow diagram of an alternative play sequence according to the present invention. In the play sequence disclosed in FIG. 10, the turn player is asked to identify the target pattern or pass (step 1001).

If the player elects to identify the target pattern, play proceeds to the "identify" query in which the player attempts to identify the target pattern in any of the methods described above with respect to FIG. 1 (step 1002). If the identification is correct, play proceeds to the "game over" query (step 1003). From step 1003, the game preferably proceeds according to steps 115–119 described above with respect to FIG. 1.

If the identification in step 1002 is not correct, the target pattern is further preferably resolved through a computer implemented or player selected decrement (step 1004). The decrement can be the further resolution of an arbitrary pixar or of the entire target pattern. Additionally, when the resolution is computer-implemented the portion of the target pattern to be resolved can be selected by the data processing system to be a significant pixar of the target pattern, i.e., a pixar that is geometrically near pixars that have already been further resolved. In this way the player who did not correctly identify the target pattern is penalized because an advantageously further resolved target pattern is presented to the next player.

If, in step 1001, the player elects to pass, the player nominates an operation (step 1005). Step 1005 is similar to step 107 described above with respect to FIG. 1. In step 1005, the player determines which pixar to resolve further. The nomination in step 1005 has strategic implementations in that the target pattern will be more fully resolved and then presented to the next player for identification. Thus, the player can nominate a pixar that is meaningless for purpose of identification or can resolve the target pattern in a helpful way in the hope that his opponents will still not be able to identify the target pattern.

After the turn player nominates an operation, the target pattern which has been more fully resolved by a computer-implemented resolution in step 1004 or by a player selected resolution in step 1005 is presented to another player (step 1006). Step 1006 is similar to step 109 described above with respect to FIG. 1. After the target pattern is presented in step 1006, the game proceeds with the next player identifying or passing as shown in step 1001.

In the embodiment described with respect to FIG. 10, the players preferably use a point and click device, e.g. a mouse, for all inputs and responses. The target pattern identity can be entered through an on-screen virtual keyboard by spelling the desired label. Alternatively, a conventional keyboard can be used. Entry evaluation is preferably performed automatically by, for example, a lexicographic proximity routine that matches the entered target pattern identity to one or more correct identity labels stored with the target pattern as a list or as a primitive semantic web. Players can also input the target pattern identity by voice which is processed by voice recognition software.

It should be noted that FIG. 10 does not show a scoring or response processing. However, scoring and response processing, such as described above with respect to FIG. 1, could also be included in the game method described with respect to FIG. 10.

As described above, the method of target pattern identification according to the present invention includes target pattern identification by successive revelation of a masked target pattern. The revelation game preferably begins with the target pattern being entirely or partially "masked." The target pattern can be covered with arbitrarily shaped (i.e., regular to irregular) "tiles" that are either neutral (i.e. "blank") or contain another confusing or camouflaging pattern or series of patterns, as shown in FIGS. 4 and 5. As the game progresses, the tiles are removed, thereby progressively revealing more and more of the target pattern until it is correctly identified or the round ends by other means. A complete game may consist of one or more rounds.

In visual revelation, the covering tiles are indeed tiles in the formal geometrical or graphical sense. The removal of the tiles reveals the completely formed portion of the target pattern that was formerly covered. The tiles themselves may be blank in the sense of having a uniform surface pattern or may contain a confusing pattern, thereby making the discovery of the target pattern more difficult. Computer versions of the revelation game can preferably be implemented by multimedia and computer graphics programming techniques.

The visual revelation game may be directed to various age groups by appropriate selection of target pattern subject matter and/or the variation in the size and number of the covering tiles—e.g., for small children, a coarse grid of regularly shaped tiles covering a picture of Sesame Street's 'Big Bird' versus a fine grid of tiles covering the Mona Lisa for adults.

The revelation game can also comprise aural revelation. Delivery of a target pattern for revelation would preferably be through the newer multimedia personal computers and players now being offered by various manufacturers. The target pattern in this case would be a known audio sequence. The audio sequence could be represented on a screen, as shown in FIG. 11.

Figure 11:
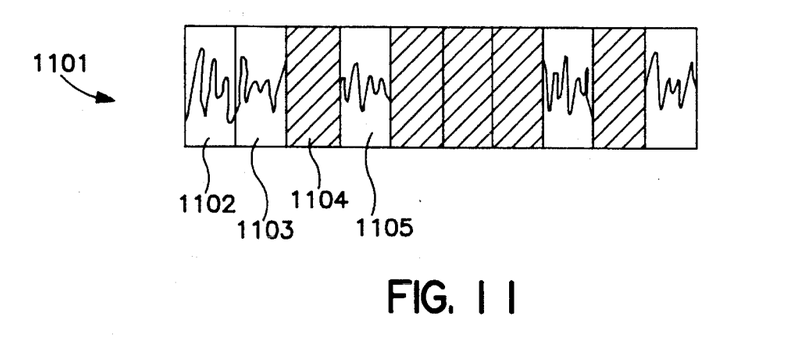
FIG. 11 is a visual representation of a masked aural target pattern.

FIG. 11 is a visual representation of a masked aural target pattern. As shown in FIG. 11, a covering visual pattern 1101 represents the temporal extent of the aural target pattern. In FIG. 11, a straight line of a consistent color and width with fiducial marks represents equal or arbitrary length time segments 1102–1105. The players preferably command the delivery device to play the audio target pattern via a standard computer/TV interface device (e.g., a hand-held remote controller). The delivery device would then play the target pattern while blanking out the masked portions. As shown in FIG. 11, tiles 1102, 1003, and 1105 refer to unmasked portions, while tile 1104 is masked. Therefore, portions 1102, 1103, and 1105 of the audio target pattern would be played.

The progress of play could preferably be further visually indicated by a moving cursor along the temporal extent dimension on the screen. The remaining covering "tiles" would then be those portions of the covering visual pattern wherein the audio target pattern is aurally blanked by either silence, a uniform tone, or constant (white or colored) noise. The "aural tiles" may also alternatively be another confusing audio pattern, thereby making the identification of the target pattern more difficult. Of course, some versions may contain a mix of the various types of covering tiles for an extremely difficult version of the game.

Specific versions of the games involving target pattern identification are described below. Each of the games described below may preferably include additional steps as described above with respect to FIGS. 1 and 10.

As described above, a version of the revelation embodiment of the target pattern identification method of the present invention includes construction of the target pattern. In such an embodiment, the target pattern can be selected from the group consisting of an audio signal, a still image, a moving video signal, a text pattern and a combination thereof.

Figure 12:
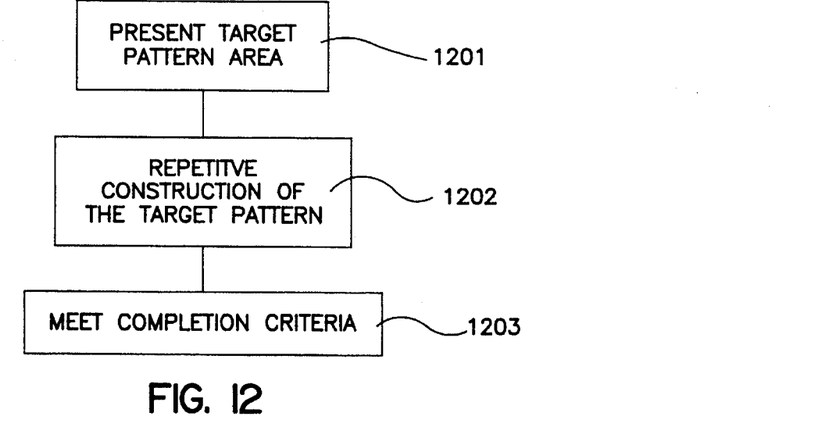
FIG. 12 is an abbreviated flowchart of the sequence of steps in a construction game according to the present invention.

FIG. 12 is an abbreviated flowchart of the sequence of steps in a construction game according to the present invention. As a first step in the construction game, the data processing system presents a target pattern area to the players (step 1201). The target pattern area is preferably blank or of a uniform color. After the target pattern area is presented to the players, it is repetitively constructed according to sequential non-lexicographic steps (step 1202). The unmasking steps can be set by the players or can be automatically set and implemented by the delivery system.

The unmasking steps can include, for example, unmasking of the target pattern only under certain circumstances. Specifically, if a certain percentage of the target pattern has been built, successive unmaskings can occur with smaller increments. Alternatively, players can "pay" greater amounts of points for greater increments of unmasking. Players can also be penalized for incorrect identification of the target pattern by losing points or having portions of the target pattern unmasked.

The repetitive construction continues until a completion criterion is met (step 1203). The completion criterion can include correct identification of the target pattern or an end-of-game indication resulting from failing to correctly identify the target pattern after all or a significant portion of the target pattern has been constructed.

In the construction method shown in FIG. 12, the players can receive the target pattern at several devices. Examples are a personal computer, a dedicated game computer, a television, a radio, an interactive television, print media and a virtual reality interface. Additionally, the construction game is played according to a predetermined rule sequence, discussed below, until the completion criterion is met.

Scoring and other processing, described above with respect to FIG. 1, can also be implemented in the target pattern construction game shown in FIG. 12.

Yet another embodiment of the present invention includes the combination of resolution, revelation and construction of visual and aural target patterns. A simple example of such an embodiment could include identification in the same game of a still image target pattern with a related audio target pattern. For example, a still image of John F. Kennedy on the Berlin podium with the audio sequence, "Ich bin ein Berliner!" could be the combination target pattern. This would permit the players to reveal and/or resolve either or both target patterns progressively for identification.

Additionally, a combination target pattern identification game according to the present invention could include a motion video sequence of target patterns through a series of filters. The ability to present this type of target pattern effectively is limited only by the processing power of the game's delivery system.

Figure 13:
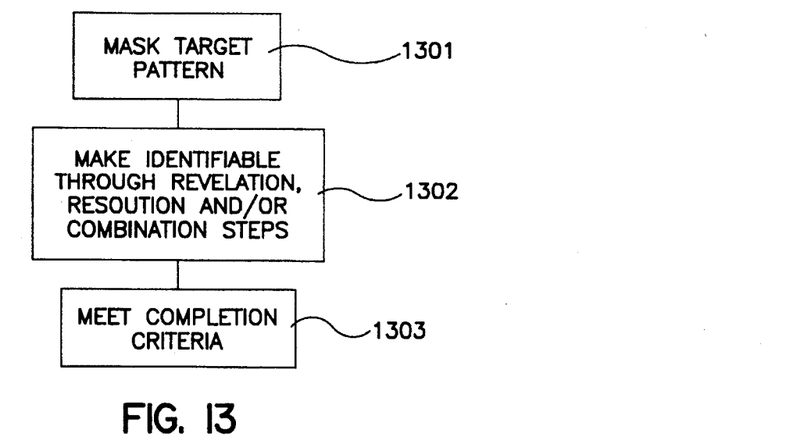
FIG. 13 is an abbreviated flowchart of the sequence of steps in a combination target pattern game according to the present invention.

FIG. 13 is an abbreviated flowchart of the sequence of steps in a combination target pattern game according to the present invention. As a first step in the combination target pattern game, the target pattern is masked to make it imperceptible to the players (step 1301). The masking may be performed in any of the methods described above, or by other suitable processing.

After the target pattern is masked, it is repetitively made identifiable according to a combination of non-lexicographic revelation, resolution and construction steps (step 1302). In step 1302, the masked target pattern is successively unmasked by revelation, resolution and/or construction steps.

In such an embodiment, a portion of the target pattern can be masked for subsequent revelation by covering the target pattern with tiles while another portion of the target pattern is masked requiring resolution for identification. Additionally, portions of the target pattern can be blanked requiring construction for identification. The interleaving of the different masking techniques can make the game more difficult.

In the combination game, the target pattern is made identifiable until a completion criterion is met (1303). As described above with respect to FIG. 12, the completion criterion of step 1303 can include correct identification of the target pattern or an end of game indication resulting from failure to identify the target pattern after all or a significant portion of the target pattern has been made identifiable.

As described in detail above, the unmasking methods for target pattern identification according to the present invention include resolution of a target pattern. The target pattern to be identified from a process of successive resolutions can comprise an audio signal, a still image, a moving video signal, a text pattern and a combination thereof, and can be delivered to the players by various devices including a personal computer, a dedicated game computer, television delivery, broadcast radio, print media, interactive TV, and a virtual reality interface.

Figure 14:
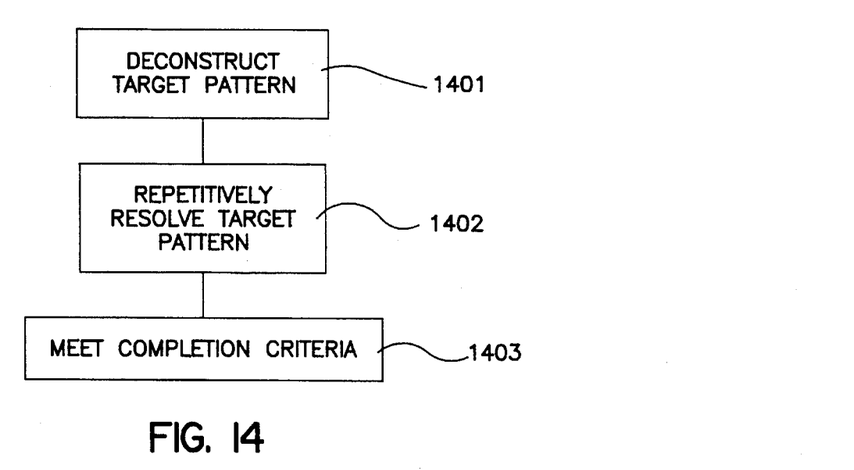
FIG. 14 is an abbreviated flowchart of the sequence of steps in a target pattern resolution game according to the present invention.

FIG. 14 is an abbreviated flowchart of the sequence of steps in a target pattern resolution game according to the present invention. As a first step, the target pattern is masked to make it imperceptible to the players (step 1401). The masked target pattern is then repetitively resolved according to predetermined resolution steps (step 1402). These steps include those described above with respect to the combination game. The target pattern is continually resolved until a completion criterion, such as those described above with respect to FIG. 12, is met.

Figure 15:
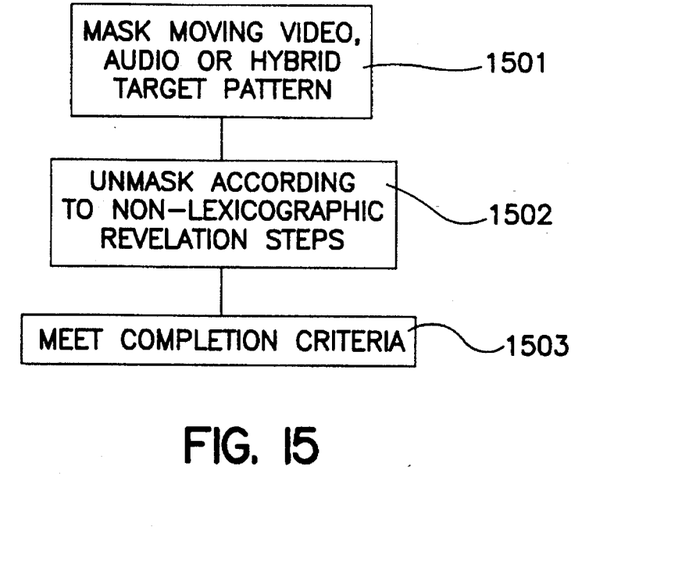
FIG. 15 is an abbreviated flowchart of the sequence of steps in a target pattern revelation game according to the present invention.

FIG. 15 is an abbreviated flowchart of the sequence of steps in a target pattern revelation game according to the present invention. The revelation game according to the flowchart of FIG. 15 includes the revelation of a moving video sequence, an audio signal or a multimedia signal. A hybrid or multimedia target pattern is defined as a combination of at least two of the media group comprising an audio signal, a still image, a moving video signal, a text pattern.

As a first step of such revelation, a moving video target pattern, an audio target pattern or a hybrid target pattern is masked to be imperceptible and then is presented to the players (step 1501).

The masked target pattern is repetitively unmasked in predetermined portions according to non-lexicographic revelation steps (step 1502). The target pattern is continually revealed until a completion criterion is met (step 1503).

Figure 16:
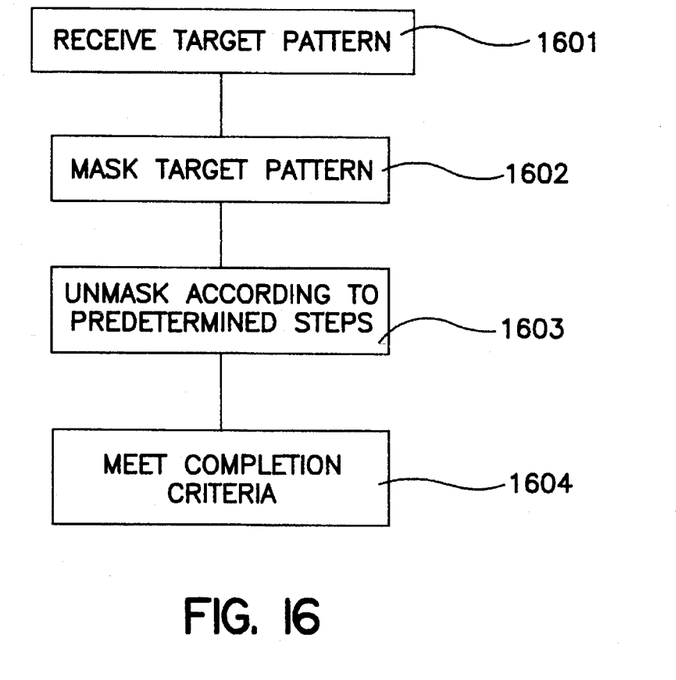
FIG. 16 is an abbreviated flowchart of the sequence of steps in another target pattern revelation game according to the present invention.

FIG. 16 is an abbreviated flowchart of the sequence of steps in another target pattern revelation game according to the present invention. According to the revelation method disclosed in FIG. 16, a target pattern to be identified is received by one of a personal computer, a dedicated game computer, an interactive television, and a virtual reality interface (step 1601). After the target pattern is received, it is masked to make it imperceptible to the players (step 1602). After masking, predetermined portions of the target pattern are repetitively unmasked according to preselected steps (step 1603). The repetitive unmasking is performed on the target pattern until a completion criterion is met (step 1604).

All of the target pattern identification methods according to the present invention are governed by rule sets. The rule sets can be applied to any of the target pattern identification games described above.

In the possible rule sets of the present invention, a target pattern is preferably assigned N points with these points being divided between portions of the target pattern. For example, in the revelation game, each of the tiles can be assigned a certain point value. These point values can be equal or unequal. During play, each player uncovers one or more tiles and then either guesses or passes. For a correct guess, the player gets all points remaining on the still covering tiles; if the target pattern is misidentified, these points can be divided equally among the remaining players.

Another example of a possible rule set according to the present invention could require the turn player to first guess the identity of the target pattern. If the player passed, then the player could complete his turn by removing tiles. Here, the strategy would then be for the player to select tiles judiciously to reveal little information to the opponents while maximizing his own information based on his hunch of the identity of the target pattern.

Alternately, the rule sets versions allowing the player to remove one or more tiles first and then guess would call for clever strategies because each player would still choose tiles that provide him with the most information based on his current assumption of the target pattern's identity.

Various rule sets that could be implemented include revealing then guessing, and guessing then revealing. Additionally, only one tile may be revealed per turn or more than one tile may be revealed based on a cost of the tile or the roll of dice. Additionally, all tiles may cost the same or tiles may be accorded different costs. If the tiles are accorded different costs, or are worth different amounts of points, such different cost tiles are preferably placed systematically (e.g., higher costs near the center) or randomly.

Yet another rule set of the present invention could implement a memory version of the game in which only a fixed amount of the target pattern is made available to the players at any one time. This would require each player to change the unmasked portions of the target pattern, thereby forcing the players to synthesize the target pattern in their mind as the play proceeds.

In another rule set according to the present invention each player could attempt to identify the target pattern during each round of play. Thus, after a portion of the target pattern is revealed, resolved or constructed, each player could try to identify the target pattern. Appropriate penalties could be levied for incorrect identifications.

Using still another rule set, "revelation poker" could be played. In such a game, an initial bet and target pattern identification are made. All remaining players must progressively increase the size of their bet and offer a conflicting target pattern identification or drop from the game. A player may choose a new identification, not held by another player, by offering a new bet. The player's previous identification may again be selected by any other player as more information about the target pattern is made available.

The game continues like poker until no player wishes to further raise the bet. During the betting, the target pattern can be further revealed, resolved or constructed. The game ends with the last player correctly identifying the target pattern winning all of the bets. If no player correctly identifies the target pattern, all of the players' bets are lost.

The rule sets described above with respect to revelation are equally applicable to the resolution and construction identification games. Additionally, however, more advanced versions of the resolution identification game could preferably permit a player to select only certain target pattern elements or regions to be resolved.

The target pattern identification games according to the present invention are preferably played on microcomputer based delivery systems which include, but are not limited to, all types of personal computers, video games, coin operated and arcade systems, compact disc interactive players, large screen play systems for game shows and other public places and interactive videodisc systems.

Figure 17:
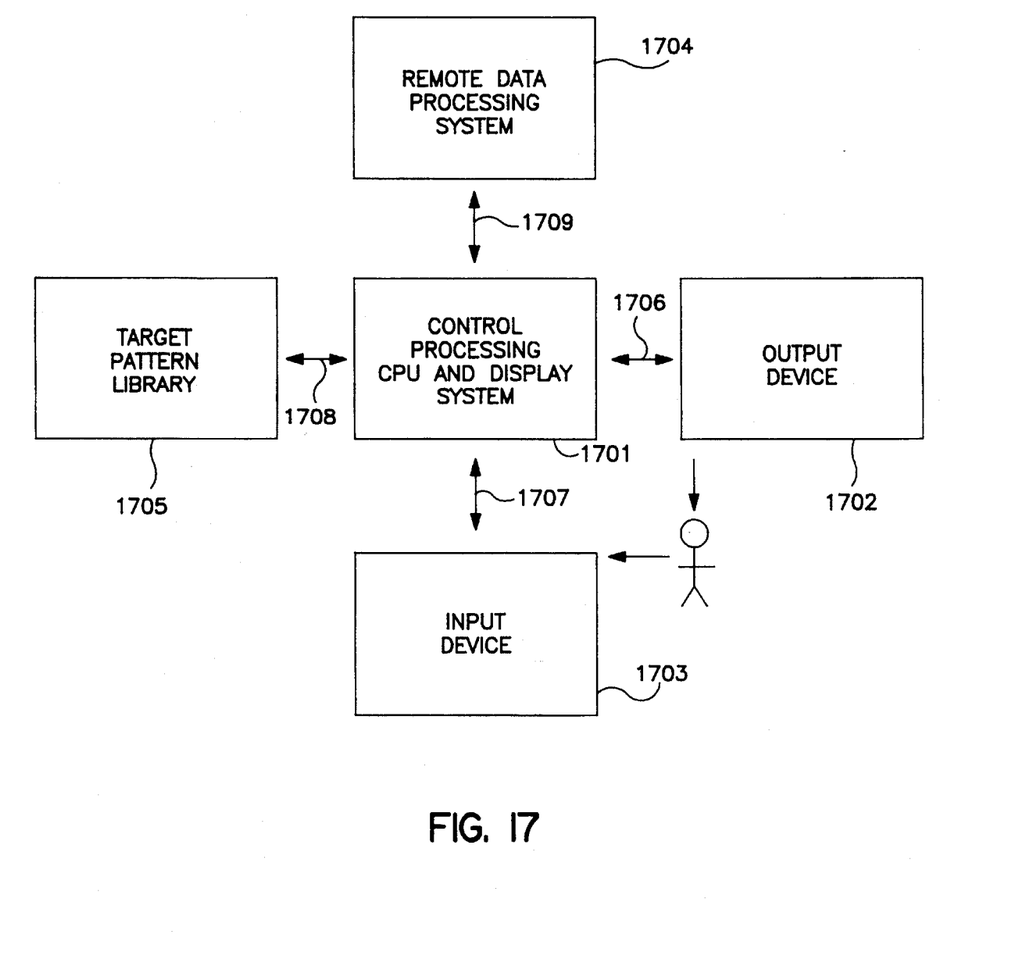
FIG. 17 is a block diagram of apparatus used for target pattern identification according to the present invention.

FIG. 17 is a block diagram of apparatus used for target pattern identification according to the present invention. The apparatus includes a control processing CPU and display system 1701 that interfaces with the players and performs the steps described above with respect to FIG. 1. Processing system 1701 can store current target patterns and can perform the masking and unmasking described above with respect to FIGS. 4–6 and 11. The processing system 1701 is responsive to player input and performs repetitive unmasking of the target pattern as the game progresses. Additionally, the processing system 1701 compares the target pattern identifications input by the players with the known correct target pattern identification and maintains the scores of the players. The rule sets used to implement target pattern identification are stored and performed by the data processing system 1701.

The target patterns and player scores are presented to the players using an output device 1702. Output device 1702 can be, for example, a screen, such as a movie screen, a television screen, or a computer screen. Output device 1702 can be a speaker when audio target patterns are to be identified. In fact, output device 1702 can be both a screen and a speaker when combination target patterns are to be identified. Additionally, more than one output device 1702 can be connected to the data processing system 1701 so that players can be located in different places and play the same game.

Processing system 1701 is also connected to an input device 1703 through which players input commands and target pattern identifications. Input device 1703 can be, for example, a keyboard, a mouse, a remote control, a remote control a touchscreen or a microphone. As with the output device, there can be more than one input device 1703 connected to the data processing system 1701 to allowing remotely located players to play a single game.

The operations performed on the target pattern, such as unmasking, need not take place at the data processing system 1701, but may also be performed centrally at a remote data processing system 1704. The remote data processing system can be shared by several game systems.

In addition to a remote data processing system 1704, the game apparatus of the present invention can be connected to a target pattern library 1705 containing selectable target patterns. The target pattern library 1705 may be a local hard disk, a floppy disk, an optical disk or a remote target pattern library. Use of a remote target pattern library 1705 greatly expands the number of target patterns available for play. Additionally, the target patterns can be constantly updated. Another benefit of a remote target pattern library 1705 is that less memory is required in the processing system 1701.

The elements of the target pattern identification apparatus are connected together by 2-way communication links 1706–1709. The communication links 1706–1709 may be part of a self-contained system or may be links between remote devices such as telecommunication channels. The remote data processing system 1704 and a remote target pattern library 1705 can be coupled to the data processing system 1701 by, for example, telephone lines, optical fibers, MAN, ISDN or B-ISDN, microwave, DBS, or cable.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of presenting an audio target pattern to be perceived by a listener for identification of the audio target pattern comprising the steps of:

masking the audio target pattern to make it imperceptible to the listener;

repetitively and non-sequentially unmasking portions of the audio target pattern according to preselected steps; and continuing to unmask the audio target pattern until a completion criterion is met.

2. The method according to claim 1, further comprising the step of delivering the audio target pattern to the listener using one of a personal computer, a dedicated game computer, a radio, a television, a virtual reality interface, and combinations thereof.

3. The method according to claim 2, wherein the step of repetitively unmasking is performed according to a predetermined rule sequence until the completion criterion is met.

4. An apparatus for presenting an audio target pattern to be perceived by a listener for identification of the audio target pattern, comprising:

a data processing system including means for masking the audio target pattern to make it imperceptible to the listener, for repetitively and non-sequentially unmasking portions of the audio target pattern according to input from the listener, and for comparing a target pattern identification input by the listener with a known correct target pattern identification;

an input device, coupled to the data processing system, for receiving the listener input; and an output device, coupled to the data processing system, for outputting the masked audio target pattern to the listener as the audio target pattern is unmasked and for outputting an indication of whether the audio target pattern identification input by the listener is equivalent to the known correct audio target pattern identification.

5. The apparatus according to claim 4, wherein the output device comprises one of a screen, a speaker, a virtual reality device, and combinations thereof.

6. The apparatus according to claim 4, wherein the input device comprises one of a keyboard, a mouse, a touchscreen, a microphone, a virtual reality device, and combinations thereof.

7. The apparatus according to claim 4, further comprising a target pattern library for storing the audio target pattern.

8. The apparatus according to claim 7, wherein the target pattern library is a remote target pattern library.

9. The apparatus according to claim 8, wherein the data processing system is a remote data processing system.

10. The apparatus according to claim 7, wherein the data processing system is a remote data processing system.

11. The apparatus according to claim 4, wherein the data processing system is a remote data processing system.

12. An apparatus for presenting an audio target pattern to be perceived by a listener for identification of the audio target pattern, comprising:

means for masking the audio target pattern to make it imperceptible to the listener;

means for repetitively and non-sequentially unmasking portions of the audio target pattern according to preselected steps; and means for continuing to unmask the audio target pattern until a completion criterion is met.

13. The apparatus according to claim 12, further comprising means for delivering the audio target pattern to the listener using one of a personal computer, a dedicated game computer, a radio, a television, an interactive television a virtual reality interface, and combinations thereof.

14. The apparatus according to claim 12, further comprising a target pattern library for storing the audio target pattern.

15. The apparatus according to claim 14, wherein the target pattern library is a remote target pattern library.

* * * * *